March 22, 1966  A. J. LITTLE  3,241,794
MOUNTING MEANS FOR A FLANGED GAUGE
Filed April 21, 1964

INVENTOR
Arthur J. Little

By A. G. Douvas.
Attorney

United States Patent Office 3,241,794
Patented Mar. 22, 1966

3,241,794
MOUNTING MEANS FOR A FLANGED GAUGE
Arthur J. Little, Springfield, Ill., assignor to Stewart-Warner Corporation, Chicago, Ill., a corporation of Virginia
Filed Apr. 21, 1964, Ser. No. 361,346
3 Claims. (Cl. 248—27)

This invention relates to an improved means for mounting a flanged gauge or the like flush with a mounting panel, and includes a strap keyed to the gauge by appropriate locking means and biased against the panel on the side thereof opposite the flange.

It is common in automotive and marine fields, for example, to mount gauges on a dash panel by providing a front flange on the gauge, fitting the rear portion of the gauge through a properly sized opening in the dash panel until the flange abuts the panel, and holding a strap or stirrup against the rearward side of the panel by appropriate locking means connecting it to the gauge. The two areas of desired improvement on this type installation are to prevent unwanted rotation of the secured gauge caused by vibration or the like of the panel and to provide adequate clearance between the strap and other structure adjacent the rear portion of the gauge. In most cases, the strap is U-shaped to straddle the rear of the gauge in a certain predetermined angular relationship relative to the mounting panel so as to provide the maximum expected clearance.

Accordingly, an object of this invention is to provide for a flanged gauge or the like flush mounted within an opening against a mounting panel an improved mechanical interlock between the gauge and the securing strap, operable thereby to fix them against rotation relative to one another and consequently relative to the interpositioned mounting panel.

Another object of this invention is to provide for a gauge or the like flush mounted to a mounting panel an improved mounting arrangement between a stud of the gauge and a mounting strap including an interlocking key and keyway combination formed at selected rotatable positions relative to the axis of the stud, operable thereby to secure the strap nonrotatably to the gauge in any of a plurality of angular planes relative to the mounting panel.

In order that these and other objects can be more fully appreciated, reference is herein made to the accompanying drawing, wherein.

Figure 1:
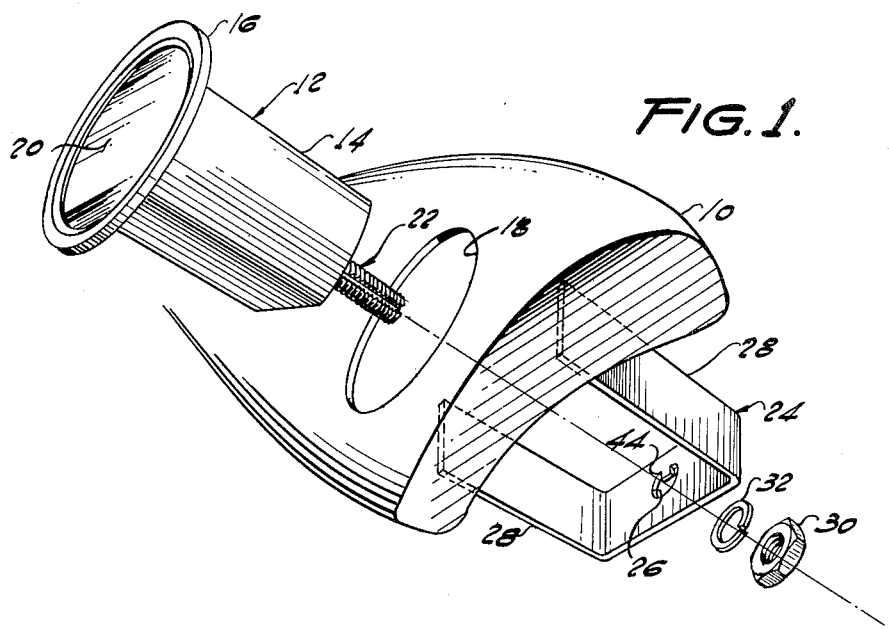
FIG. 1 is a perspective view of a typical mounting panel, and shows in exploded preassembled relationship thereto a typical flanged gauge or the like having a preferred embodiment of the subject invention.
Figure 4:
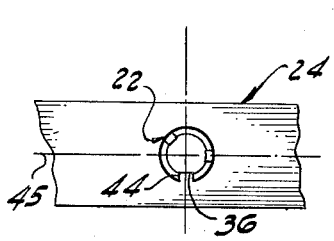
Figure 5:
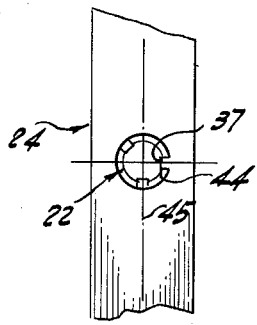
Figure 6:
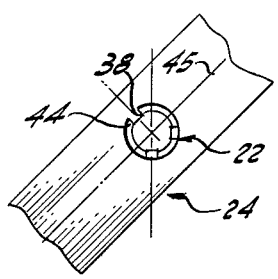
Figure 3:
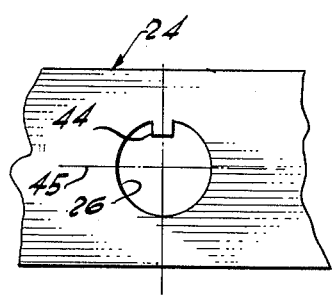
FIG. 3 is an end view, to the same scale as FIG. 2, of the strap of FIG. 1.
Figure 2:
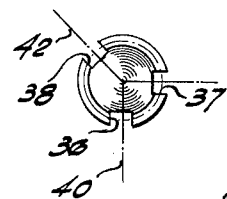
FIG. 2 is an enlarged end view of the stud shown projecting from the gauge of FIG. 1.

FIGS. 4, 5, and 6 show various interconnected positions of the strap and stud combination, to a slightly smaller scale than FIGS. 2 and 3, of the embodiment disclosed in FIG. 1.

FIG. 1 shows a mounting panel 10 typical in the automotive or marine vehicles. A gauge 12 having a case or body 14 including an annular enlarged flange 16 at one end thereof is positioned through an opening 18 in the panel 10 until the flange 16 abuts the panel. The forward face 20 of the gauge 12 is transparent to reveal a scale therebeneath across which a movable pointer (not shown) traverses to give the appropriate readings for the gauge. A stud 22 projects rearwardly from the rear of the case 14, and a U-shaped strap or stirrup 24 having a receiving opening 26 therein for the stud 22 is positioned over the stud so that the free ends 28 of the strap straddle the gauge and abut the panel generally opposite the flange 16.

A hex head nut 30 threaded onto the stud 22 projecting through the opening 26 in the strap 22, and a lockwasher 32 interposed therebetween hold the strap to the gauge as is well known in the art.

The subject invention improves this typical arrangement. Commonly, as shown in the FIG. 1, the gauge 12 is elongated and defines a circular flange 16. Similarly, the opening 18 in the panel is circular so that with nothing more the gauge 12 can generally rotate about its longitudinal center axis even when supposedly secured in place within the panel opening 18. Notwithstanding the possibility of promoting this defect, it is frequently desired to position the legs 28 of strap 24 in any of a plurality of rotative planes extending through the stud 22 normal to the plane of the panel 10. Consequently, in the subject mounting arrangement only one stud 22 is used and it is centered relative to the flange 16. This is different from most prior art gauge mounts since therein either more than one stud projects from the gauge, or if a single stud only is used it is offset from the center of the gauge.

In order to provide for this center mounting of the single stud 22 but yet prevent rotation of the gauge 12 and strap 24 relative to one another, the stud 22 has a plurality of spaced axial keyways 36, 37 and 38 shown, respectively, in a vertical plane 40, a horizontal plane 41, and at a transverse plane 42 at a 45° angle. The strap 24 similarly has at its opening 26 a single key or lug 44 projecting into the circular periphery of the opening 26 normal to the center plane 45 of the strap. Preferably the opening 26 is sized to fit complementary over the stud 22 and the key or lug 44 is sized to fit complementary within the keyways 36, 37 and 38. As such, the strap can fit snugly over the stud 20, as shown in FIGS. 4, 5, and 6 in any of three rotatable alignments relative to the axis of the stud. For example, in FIG. 4, the key 44 fits within keyway 36 to give the horizontal alignment; in FIG. 5, the key 44 fits within keyway 37 to give the vertical alignment; and in FIG. 6, the key 44 fits within the keyway 38 to give an inclined alignment at a 45° inclination.

It is thus seen that with this invention the strap 24 can be positioned in any planar alignments predetermined by the angular arrangements of the keyways and the key. This enables the alignment of the strap to provide the maximum clearance required behind the panel 10 with the adjacent structure. Similarly the keying together of the strap 24 and the gauge 12 through the interaction of the complementary key and keyways lock with ample frictional force the panel therebetween to prevent unwanted rotation of both the gauge 12 and strap 24.

It will be realized of course that the angular alignments disclosed of the strap are only representative and by no means inclusive. As shown, for example, the angle in FIG. 6 is approximately 45° but it can be made anything desired. Similarly, more or less than three keyways similar to those at 36, 37, and 38 can be formed in the stud 22, or the angular positioning of the keyways in the stud or the key in the strap can be varied relative to both the gauge and one another or the strap to suit the needs of the particular mounting arrangement. Furthermore, the use of the term "gauge" herein is only for convenience, since it is obvious the subject invention can be used on other flanged devices such as meters, clocks or the like commonly not considered a gauge.

While only a single embodiment of this invention has been disclosed it will be obvious to those skilled in the art that other modifications are possible without departing from the inventive concept of the disclosure. Accordingly, it is desired that this invention be limited only by the scope of the claims hereinafter following.

What is claimed is:

1. A combination for use in a panel having front and rear surfaces with an opening communicating between said front and rear surfaces, the improvements comprising a gauge rotatably received in said opening and having a front flange for planar abutting engagement with the front surface of said panel, a stud fixedly projecting from the rear of said gauge along the central axis of said gauge and having a longitudinal keyway therein, a U-shaped strap having a stud opening therein for receiving said stud with the side legs of said strap straddling said gauge, an integrally formed key on said strap projecting into said stud opening for engagement with said keyway to prevent relative rotation between said gauge and strap, and means for threaded engagement with said stud to force the ends of said side legs and said flange into engagement with the respective surfaces of said panel with the frictional force of said flange and strap on said panel solely restraining rotation of said gauge and strap relative said panel.

2. A combination for use in a panel having front and rear surfaces with an opening communicating between said front and rear surfaces, the improvement comprising a gauge rotatably received in said opening and having a front flange for abutting engagement with the front surface of said panel, a stud fixedly projecting from the rear of said gauge along the central axis of said gauge and having a plurality of angularly spaced longitudinal keyways in the surface of said stud, a U-shaped strap having a stud opening therein for receiving said stud with the side legs of said strap straddling said gauge, an integrally fromed key on said strap projecting into said stud opening for engagement with any one of said keyways to prevent relative rotation between said gauge and strap while enabling the selective angular fixed positioning of said strap relative said gauge, and a nut for threaded engagement with said stud to force the ends of said side legs and said flange into engagement with the respective surfaces of said panel under frictional force, whereby said gauge is restrained from rotating solely by said frictional force with said frictional force being the combined frictional force of said strap and gauge against said panel.

3. A mounting arrangement for a flanged gauge having a mounting stud, comprising a panel having a circular opening therein sized to receive without restriction the rear portion of the gauge only to the flange, a U-shaped strap having spaced side legs straddling the rear portion of the gauge and having an opening generally complementary in size to receive snugly the stud on the gauge, whereat the side legs of the strap abut the rearward side of the panel opposite generally the flange, means including a complementary keying arrangement between the strap and the stud operable to prevent rotation of said strap and said gauge relative to one another, the keying arrangement between the strap and stud including at least two keyways formed axially of the stud and disposed angularly of one another at an angle other than 180°, and a single key on the strap at the opening thereof generally complementary in size to the keyways to fit within any one of said keyways to lock nonrotatably relative to one another in a selected angular position the strap and the stud, and a threaded nut for the stud for drawing with sufficient force the strap to the flange to trap therebetween the panel solely by frictional force for restraining rotation of the gauge and strap relative to the panel with said key and keyway preventing relative rotation between said gauge and strap for combining the frictional force of said strap with the frictional force of said gauge to resist rotation relative said panel.

References Cited by the Examiner

UNITED STATES PATENTS

| | | | |
|---|---|---|---|
| 1,588,254 | 2/1926 | Matthews | 235—96 |
| 1,723,434 | 8/1929 | Nutt | 235—96 |
| 2,697,776 | 12/1954 | Wale | 248—291 X |
| 2,759,620 | 8/1956 | Pharris | 248—291 X |
| 2,917,267 | 12/1959 | Riddle | 248—361 |
| 3,107,390 | 10/1963 | Shelton | 16—152 |

FOREIGN PATENTS 1,185,717   2/1959   France.

CLAUDE A. LE ROY, *Primary Examiner.*

FRANK L. ABBOTT, *Examiner.*